United States Patent [19]
Straub

[11] 3,876,764
[45] Apr. 8, 1975

[54] VACCINES FOR INFECTIOUS PUSTULAR VULVOVAGINITIS
[75] Inventor: Otto Christian Straub, Tuebingen, Germany
[73] Assignee: Farbenfabriken Bayer Aktiengesellschaft, Leverkusen, Germany
[22] Filed: Jan. 4, 1974
[21] Appl. No.: 430,750

Related U.S. Application Data
[63] Continuation of Ser. No. 160,177, July 6, 1971, abandoned.

[30] Foreign Application Priority Data
July 8, 1971 Germany............................ 2033946

[52] U.S. Cl. ..................... 424/89; 195/1.5; 195/1.3
[51] Int. Cl. ........................... C12k 7/00; C12k 5/00
[58] Field of Search .................................... 424/89; 195/1.1–1.8

[56] References Cited
UNITED STATES PATENTS
2,934,473  4/1960  York et al............................ 424/89

OTHER PUBLICATIONS
Cramer et al., Experientia 17 (2): 49–57, (1961), "Density Gradient Electrophoresis as a New Tool in Virology."
Gillespie et al., Cornell Veterinarian 49; 288–297, (1959), "Comparison of Infectious Pustular Vulvovaginitis Virus with Infectious Bovine Rhinotracheitis Virus."
McKercher et al., Can. Jl. Comp. Med. 23: 320–328, Oct. 1959, "Comparative Studies of the Etiological Agents of Infectious Bovine Rhinotracheitis and Infectious Pustular Vulvovaginitis."
Saxegaard Vet. Bull. 40 (8): 605–611, Aug. 1970, "Infectious Bovine Rhino Tracheitis/Infectious Pustular Vulvovaginitis (IBR/IPV) Virus Infection of Cattle with Particular Reference to Genital Infections."

*Primary Examiner*—Shep K. Rose
*Attorney, Agent, or Firm*—Depaoli & O'Brien

[57] ABSTRACT
There is provided a live vaccine for use against the pimply rash of cattle [infectious pustular vulvovaginitis (IPV)], which vaccine is produced by electrophoretically isolating uniform virus populations of pimply rash virus strains (IPV strains), cultivating in tissue cultures of cattle cells for about 12 to 100 hours a temperature of about 36° to 42°C., separating supernatant substance, and separating from the sediment.

4 Claims, No Drawings

VACCINES FOR INFECTIOUS PUSTULAR VULVOVAGINITIS

This is a continuation, of application Ser. No. 160,177 filed July 6, 1971 now abandoned.

BACKGROUND OF THE INVENTION

1. Field of the Invention

This invention relates to a process for the production of a live vaccine which is safe and useful against the pimply rash of cattle [infectious pustular vulvovaginitis (IPV)], (exanthema coitale vesiculosum), and the vaccine produced thereby.

2. Description of the Prior Art

The production of vaccines which are useful against infectious bovine rhinotracheitis (IBR) has been known. However, as yet no one has succeeded in obtaining such vaccines in a practically harmless form. Thus the American IBR vaccine is useful only in a limited way, since it often leads to miscarriages in the case of bearing animals and therefore its use is limited to closed fattening operations and it must be applied intramuscularly. Thus to the present, a harmless, intranasal, genital or conjunctival application of IBR vaccines is not yet known. It is accordingly clear that a need exists for a harmless vaccine that can be easily and safely applied against the diseases of cattle caused by IBR (IPV) viruses.

SUMMARY OF THE INVENTION

It is accordingly one object of the invention to provide a live vaccine for use against the pimply rash of cattle.

A still further object of the invention is to provide a live IPV vaccine for use against the pimply rash of cattle which is safe and effective.

Other objects and advantages of the present invention will become apparent as the description thereof proceeds.

In satisfaction of the foregoing objects and advantages, it has now been found that a highly effective IPV vaccine can be produced by electrophoretically isolating uniform virus populations of pimply rash virus strains (IPV strains), cultivating in tissue cultures of cattle cells for about 12 to 100 hours at a temperature of about 36° to 42°C., separating supernatant substance, and separating from the sediment.

DESCRIPTION OF PREFERRED EMBODIMENTS

The process according to the invention rests on the fact that in its course, the virus strain can be weakened to such an extent in its pathogenic character that, after its application to the mucous membranes, it will produce no more clinical symptoms in the animal but will still have a completely immunological effect.

Procedures for obtaining the vaccine can be accomplished on all types of tissues of the bovine species. Calf kidneys, adrenal glands and testes are particularly suitable.

By use of the process of the invention, one will obtain a live vaccine for an (IPV) virus of a pimply rash, which can be applied either intramuscularly or on the mucous membrane (genital, intranasal and conjunctival) and which at the same time produces a certain immunity against the IBR sub type. When a vaccine produced in this manner is used with cattle, independently of the age of the cattle, no undesirable clinical symptoms will occur.

The valuable characteristics of the vaccine produced in accordance with the process of the invention will be made clear by the following experiments A to C.

Experiment A:
20 head of cattle (3 cows bearing),
Type of Application:
Intramuscular and on the mucous membranes,
Charge:
3 months after the first vaccination, or 6 weeks after the second vaccination with fully virulent virus and placed beside diseased animals (separation of the sick animals $10^{11}$ $KID_{50}$/ml secretion from the respiratory and genital tract).
Result:
No disturbance of the general condition, no miscarriages, no disease. Protection of the vaccine also extends to the sub types, therefore also against IBR.

Experiment B:
273 head of cattle (all ages, 60 of these bearing). After vaccination, no clinical phenomena, no miscarriages. Rate of fertilization, above average.

Experiment C:
277 bulls
After vaccination no clinical phenomena. In the serum neutralization test, occurrence or rise of the humored antibodies; no diseases. In this experiment it was also shown that the quality of the sperm had not been influenced negatively by the vaccination.

The vaccination virus of this invention, and particularly as mentioned in the following examples, is obtained as follows:

In the first step of the process, the field strain of the pimply rash virus is taken directly from the diseased animal. It is then cleaned electrophoretically, that is, by passage of an electrical current through a suspension of the virus to take advantage of the electrical charge on the surfaces of the particles whereby those with a negative charge travel toward the anode and those with a positive charge travel toward the cathode and those with a strong charge travel faster than those with a negative charge. The resulting cleaned virus is then checked to insure that one has obtained a generally uniform virus population.

At this point the clean uniform virus is then attenuated in its pathogenic characteristics by cultivating in tissue cultures of homologous cattle cells for a period of about 12 to about 100 hours at a temperature of about 36° to 42°C. Conveniently, in conducting this step, the cell cultures, after infection with the vaccination virus, are maintained in a medium, such as "Earl's" medium, "Hank's" medium, medium VM3a, medium Pm—13, etc., or equivalent medium, with the addition of a protein such as lactalbumin. The field strain, attenuated in this manner, must not produce any undesirable clinical symptoms after its application to the mucous membranes. After the appearance of the cytopathogenic effect, usually in about 24 to 48 hours, at which point about 80 to 100% of the cell cultures have been destroyed, the excess is decanted. The mixture is then centrifuged at a temperature of about 0° to 10°C., preferably 4°C. for 30–60 minutes. The sediment is then rejected and the supernatant substance can be used directly as a vaccine. The aqueous solution should be stored at a temperature of about −65°C.

The vaccine may also be lyophilized. In this case, stabilizers, such as dextran or gelatin, are added in accordance with the pertinent production process. Redissolution of the lyophilate is accomplished with distilled water. The solution can be stored for about 4 weeks at 4°C.

The following examples are presented to illustrate the invention but it is not to be considered as limited thereto. In the examples and throughout the specification, parts are by weight unless otherwise indicated.

EXAMPLE 1

Cell cultures on calf kidneys, after infection with the vaccination virus, are kept in "Earl's" medium and with addition of lactalbumin at 37° to 39°C. After appearance of the cytopathogenic effect (about 24 to 48 hours), which expresses itself in the fact that 80 to 100% of the cell cultures are destroyed, the excess is decanted and centrifuged at 4° C. for 40 minutes at 2000 xg. The sediment is rejected, the supernatant substance is used directly as a vaccine. Storage of the aqueous solution is at −65°C.

EXAMPLE 2

This run is conducted as in Example 1 except that the host cell used is calf testis cultures with Hank's medium and lactalbumin. The vaccine is recovered in the same manner.

EXAMPLE 3

This example is conducted as in Example 1, except that there is raised calf adrenal gland cultures with the medium PM–13 (Serva, Heidelberg).

EXAMPLE 4

This example is conducted as in Example 2, except that VM3a medium is used for raising calf testis cultures. Recovery procedures for the vaccine are the same.

The invention has been described herein with reference to certain preferred embodiments. However as obvious variations thereon will become apparent to those skilled in the art the invention is not to be considered as limited thereto.

What is claimed is:

1. The harmless live stabilized lyophilate vaccine produced by a process which comprises isolating uniform populations of viruses taken directly from animals diseased with a field strain, which in virulent form causes infectious pustular vulvovaginitis and bovine coital exanthema, by subjecting the field strain of said virus suspended in a conducting fluid medium to an electrical current under electrophoretic conditions, cultivating and attenuating said uniform population of virus in media-maintained tissue culture of cattle cells for a period of time between about 12 and 100 hours at a temperature between about 36°C. and 42°C. until appearance of the cytopathogenic effect indicates that about 80–100% of the cell culture has been destroyed, and separating an aqueous vaccine from sedimented tissue solids by centrifuging the mixture at about 0°C. to 10°C. for about 30 to 60 minutes, recovering the aqueous supernatant useful directly as a vaccine, and lyophilizing the vaccine, with a stabilizer, to a water-reconstitutable lyophilate.

2. The process of claim 1 wherein the said tissue culture is calf kidneys, adrenal glands or testes of calves.

3. The process of claim 1 wherein said cultivating of virus in tissue culture is conducted in "Earle's" medium, "Hank's" medium, medium PM–13 (Serva, Heidelberg) or VM3a medium.

4. A process for immunizing cattle for the prevention of infectious pustular vulvovaginitis, bovine exanthema and infectious bovine rhinotracheitis diseases which comprises inoculating cattle with a reconstituted stabilized lyophilate vaccine of claim 1 by intramuscular, intranasal, genital or conjunctival application.

* * * * *